United States Patent
Oliver

[15] 3,656,960
[45] Apr. 18, 1972

[54] PHOTOGRAPHIC SILVER HALIDE EMULSIONS CONTAINING μ-CHLOROCARBOCYANINE DYES

[72] Inventor: Gene L. Oliver, Rochester, N.Y.

[73] Assignee: Eastman Kodak Company, Rochester, N.Y.

[22] Filed: Apr. 3, 1970

[21] Appl. No.: 25,550

[52] U.S. Cl. ................................96/134, 96/135, 96/137, 260/240.6, 260/240.65
[51] Int. Cl. ................................................G03c 1/18
[58] Field of Search ........................96/134, 137, 135, 136

[56] References Cited

UNITED STATES PATENTS 2,111,183   5/1938   Heilbron et al. ........................96/131
2,231,659   2/1941   Brooker et al. ........................96/137

Primary Examiner—J. Travis Brown
Attorney—W. H. J. Kline, J. R. Frederick and Dennis M. DeLeo

[57] ABSTRACT

Meso-Carbocyanine dyes having a chloro-substituent in the meso-position (such as 9-chloro-3,3'-diethylthiacarbocyanine chloride) are useful as photographic silver halide sensitizing dyes. They can be prepared by condensing two heterocyclic quaternary salts, of the types used in preparing cyanine dyes, which are salts of non-nucleophilic anions and which are substituted, at the nuclear position desired for attachment to the intervening trimethine chain, with substituents such as chloro and 2-(2-chloropropenyl) substituent respectively.

5 Claims, No Drawings

PHOTOGRAPHIC SILVER HALIDE EMULSIONS CONTAINING μ-CHLOROCARBOCYANINE DYES

This invention relates to carbocyanine dyes and particularly to carbocyanine dyes having a chloro-substituent in the meso-position (μ-) and useful as spectral sensitizers in photographic silver halide emulsions and as intermediates in the preparation of other meso-substituted carbocyanine dyes.

Previous attempts to synthesize μ-chlorocarbocyanines have been unsuccessful due to the presence of nucleophilic groups liberated during the course of reaction which tend to displace the chlorine atom from the μ-position. The meso-position, represented by the symbol μ-, refers to the central atom of the trimethine chain which intervenes the two heterocyclic nuclei present in carbocyanine dyes. While μ-substituted carbocyanines having arylthio- or alkylthio- groups at the μ-position are known to be useful as intermediates in the preparation of carbocyanine dyes useful as photosensitizers, the former compounds tend to be highly insoluble, inert in the presence of weak nucleophiles and have a tendency to decompose. As a result of these defects, their use as intermediates is limited to the preparation of dyes having a strong nucleophile at the μ-position.

It is accordingly an object of the present invention to provide novel μ-chlorocarbocyanine dyes which are useful as spectral sensitizers for photographic silver halide.

It is another object of this invention to provide new μ-chlorocarbocyanine dyes which are useful as an intermediate in the formation of additional μ-substituted carbocyanine dyes.

A further object of the instant invention is to provide a novel process for making μ-chlorocarbocyanine dyes.

Still another object of this invention is to provide a new photographic silver halide emulsion specially sensitized with μ-chlorocarbocyanine dyes.

These and other objects will become increasingly apparent from a reading of the following specification and appended claims.

The objects of this invention are accomplished with new μ-chlorocarbocyanine dyes, with a process for preparing these dyes and with light-sensitive photographic silver halide emulsions containing a hydrophilic colloid, silver halide grains and a sensitizing amount of a 9-chlorocarbocyanine dye.

Advantageous μ-chlorocarbocyanine dyes include those having the formula:

(I)

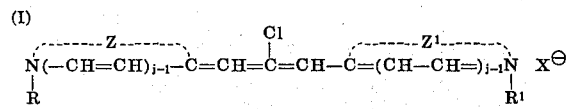

wherein:

a. each of Z AND $Z^1$ represents the nonmetallic atoms necessary to complete a heterocyclic nucleus of the type used in cyanine dyes, b. j represents a positive integer having a value of from 1 to 2, c. each of R and $R^1$ represents an alkyl radical having from one to four carbon atoms, and d. $X^\ominus$ represents a non-nucleophilic anion.

Desirable nuclei of the types used in cyanine dyes include those wherein the nonmetallic atoms represented by Z and $Z^1$ are those necessary to complete (in conjunction with the specific nuclear atoms described in the above Formula I) heterocyclic nuclei having in the nuclei at least one atom selected from the group consisting of nitrogen, oxygen, sulfur and selenium. Advantageous heterocyclic nuclei completed by Z and $Z^1$ atoms also include those containing a heterocyclic ring, which can be fused to additional ring systems, including a chromophoric nitrogen atom and from four to five additional atoms of which from three to four atoms are carbon atoms and wherein the remaining additional atoms is selected from either carbon, nitrogen, oxygen, sulfur or selenium atoms.

Exemplary heterocyclic nuclei completed by nonmetallic Z and $Z^1$ atoms include those nuclei of the indolenine series such as indolenine (3H-indole); those of the benzindolenine series like 1H-benz(e)indole and those of the naphthindolenine series such as 3H-naphth[2,1-e]indole; those of the imidazole series such as benzimidazole compounds like 5-chlorobenzimidazole and also including compounds of the naphthimidazole series; those of the thiazole series like thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc.; those of the benzothiazole series such as benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.; those of the naphthothiazole series like naphtho[2,1-d]thiazole, 8-methoxynaphtho-[2,1-d]thiazole, 7-methoxynaphtho[2,1-d]thiazole, naphtho[1,2-d]-thiazole, 8-methoxynaphtho[1,2-d]thiazole, etc.; those of the thionaphtheno-7',6',4,5-thiazole series such as 4-methoxythionaphtheno-7',6',4,5-thiazole, etc.; those of the oxazole series, for example, 4methyloxazole, 5-methyloxazole, 4-phenyloxazole, 4,5-diphenyloxazole, 4-ethyloxazole, 4,5-dimethyloxazole, 5-phenyloxazole, etc.; those of the benzoxazole series like benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.; those of the naphthoxazole series such as alpha-naphthoxazole, etc.; those of the selenazole series, for example, 4-methylselenazole, 4-phenylselenazole, etc.; those of the benzoselenazole series like benzoselenazole, 5-chlorobenzoselenazole, 5-methoxybenzoselenazole, 5-hydroxybenzoselenazole, tetrahydrobenzoselenazole, etc.; those of the naphthoselenazole series such as alpha-naphthoselenazole; and those of the quinoline series such as quinoline, 4-methylquinoline, 5-ethylquinoline, 6-chloroquinoline, 8-chloroquinoline, 6-methoxyquinoline, 8-hydroxyquinoline, 7-methyl-4-quinoline, isoquinoline, etc..

Particularly advantageous μ-chlorocarbocyanine dyes include such dyes as, for example, a 9-chloro-3,3'-diethylthiacarbocyanine dye,
a 9-chloro-3,3'-dimethyloxathiacarbocyanine dye,
a 9-chloro-3,3'-diethylselenacarbocyanine dye,
a 9-chloro-3,3'-bis-(2-methoxyethyl)thiacarbocyanine dye,
a 6,6',10-trichloro-1,1'-diethyl-2,4'-carbocyanine dye,
a 9-chloro-3,3'-diethyl-5,5'-phenylthiacarbocyanine dye,
a 10-chloro-1,1'-diethyl-2,2'-carbocyanine dye,
a 9-chloro-1,1'-diethyl-4,5,4',5'-dibenzothiacarbocyanine dye,
a 9-chloro-5,5'-dimethoxyselenacarbocyanine dye, and
a 9-chloro-5-phenyl-5',6'-dimethoxythiacarbocyanine dye.

The μ-chlorocarbocyanine dyes described herein are conveniently prepared by reacting a heterocyclic quaternary salt such as one having the formula:

(II)

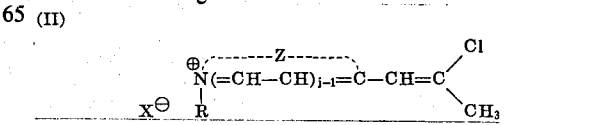

with a second heterocyclic quaternary salt such as one having the formula:

(III)

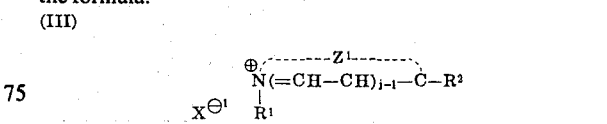

wherein each of Z, $Z^1$, $j$, R, $R^1$, $X^\ominus$ and $X^{\ominus 1}$ are as previously described, and $R^2$ represents either a halogen atom (e.g., chloro or bromo), a sulfo radical, an arylsulfonyloxy radical (e.g., p-toluenesulfonyloxy) or the like. Preferably, the non-nucleo-philic anions of each quaternary salt reagent are alike to avoid complicating purification of the resultant $\mu$-chlorocarbocyanine dye. The preparation is advantageously carried out in organic solvents, such as dimethylformamide, dimethylacetamide, acetonitrile, acetone, chloroform, etc., which are good solvents for each reagent but not for the resultant $\mu$-chlorocarbocyanine dye. Reaction temperature can be extensively varied, with temperatures ranging from about 0° C. to either the boiling point of the solvent medium or the decomposition temperature of the dye, whichever is lower. Reflux conditions are often desirable. The reaction is also preferably carried out in the presence of a basic condensing agent such as, for example, an amine base such as an alkylamine like triethylamine or additional known basic condensing agents including N-methylpiperidine, N-ethylpiperidine, triethylenediamine, N,N-diethylaniline, etc. The reaction is easily followed by noting the color change as the absorption maxima of the medium shift upon formation of the $\mu$-chlorocarbocyanine dye which spontaneously precipitates from solution.

The reagent described hereinabove by Formula III is conveniently prepared from a suitable nitrogen-containing heterocyclic compound by reaction with an alkylating agent such as an oxonium salt. Oxonium slats can be prepared according to the method of Houben-Weyl, *Methoden der Organischen Chemie*, Vol. 6, Pt. 3, p. 366, Stuttgart, Georg Thieme, 1965. Other useful alkylating agents include such compounds as activated arenesulfonic esters like methyl 2,4-dinitrobenzenesulfonate. Desirably, the alkylating agents, if in salt form, include non-nucleophilic anions.

The compound of Formula II can be prepared according to the method of Sveshnikov, Levkoev et al., *Doklady Akad. Nauk SSSR*, 148, p. 1901 (1963).

The $\mu$-chlorocarbocyanine dyes described herein are useful as intermediates in the preparation of additional $\mu$-substituted carbocyanine dyes. The $\mu$-chloro substituted carbocyanine dyes of this invention are advantageously soluble in common reaction media when compared to the $\mu$-arylthiocarbocyanine dyes which are conventionally used to prepare other $\mu$-substituted dyes. Additionally, unlike the $\mu$-arylthio substituted carbocyanine dyes, the $\mu$-chloro substituent is readily displaceable by weak nucleophiles, which effectively increases the range of potential alternative substituents which can be attracted at that position.

The dyes of this invention are useful in spectrally sensitizing photographic silver halide emulsions when incorporated therein. The dyes are especially useful for extending the spectral sensitivity of the customarily employed silver chloride, silver chlorobromide, silver bromide, silver bromoiodide and silver chlorobromoiodide developing out emulsions using a hydrophilic colloid carrier or binding agent such as gelatin, its water-soluble derivatives, polyvinyl alcohol, its water-soluble derivatives and copolymers, water-soluble vinyl polymers, such as polyacrylamide, imidized polyacrylamide, etc., and other water-soluble film-forming materials that form water-permeable coatings, such as colloidal albumin, water-soluble cellulose derivative like ethanolamine cellulose acetate, etc.

The binding agents for the emulsion layer of the photographic element can also contain dispersed polymerized vinyl compounds. Certain of such compounds are disclosed, for example, in U.S. Pat. Nos. 3,142,568 of Nottorf issued July 28, 1964; 3,193,386 of White issued July 6, 1965; 3,062,672 of Houck et al. issued Nov. 6, 1962; and 3,220,844 of Houck et al. issued Nov. 30, 1965; and include the water-insoluble polymers and latex copolymers of alkyl acrylates and methacrylates, acrylic acid sulfoalkyl acrylates or methacrylates and the like. To prepare emulsions sensitized with one or more of the dyes described herein, it is only necessary to disperse the dye or dyes in the emulsions. The methods of incorporating dyes in emulsions are simple and well known to those skilled in the art. In practice, it is convenient to add the dyes to the emulsion in the form of a solution in a suitable solvent. Methanol, ethanol, propanol, etc., acetone and pyridine are used to advantage. The dyes are advantageously incroporated in the finished washed emulsions, and should be substantially uniformly distributed throughout the emulsions.

Advantageously, the dyes are incorporated into an emulsion in a sensitizing amount and the concentration of dye in a particular emulsion can vary widely and depends upon the type of emulsion and the effect desired. The suitable and most economical concentration for any given emulsion and any specific use will be apparent to those skilled in the art upon making the ordinary tests and observations customarily used in the art of emulsion making. Generally, concentrations of from about 50 to about 1,000 mg. per mole of silver, based on the silver halide are used.

The emulsions described herein can also be sensitized with chemical sensitizers, such as with reducing agents; sulfur, selenium or tellurium compounds; gold, platinum or palladium compounds; or combinations of these. Suitable procedures are described in Shepard U.S. Pat. No. 1,623,499; Allen U.S. Pat. No. 2,399,083; McVeigh U.S. Pat. No. 3,297,447; and Dunn U.S. Pat. No. 3,297,446.

As well as including the sensitizing dyes of this invention and chemical sensitizers, the silver halide emulsions can be protected against the production of fog and can be stabilized against loss of sensitivity during keeping. Suitable antifoggants and stabilizers each used alone or in combination include thiazolium salts described in Staud U.S. Pat. No. 2,131,038 and Allen U.S. Pat. No. 2,694,716; the azaindenes described in Piper U.S. Pat. No. 2,886,437 and Heimbach U.S. Pat. No. 2,444,605, the mercury salts as described in Allen U.S. Pat. No. 2,728,663; the urazoles described in Anderson U.S. Pat. No. 3,287,135; the sulfocatechols described in Kennard U.S. Pat. No. 3,236,652; the oximes described in Carroll et al. British Pat. No. 623,448; nitron; nitroindazoles; the mercaptotetrazoles described in Kendall et al. U.S. Pat. No. 2,403,927; Kennard et al. U.S. Pat. No. 3,266,897; and Luckey et al. U.S. Pat. No. 3,397,987; the polyvalent metal salts described in Jones u.S. Pat. No. 2,839,405; the thiuronium salts described in Herz U.S. Pat. No. 3,220,839; the palladium platinum and gold salts described in Trivelli U.S. Pat. No. 2,566,263 and Damschroder U.S. Pat. No. 2,597,915.

Additionally, the emulsions useful herein can be hardened with any suitable hardener or combinations such as, e.g., formaldehyde, mucochloric acid, glutaraldehyde, maleic dialdehyde, aldehyde hardeners, aziridine hardeners, hardeners which are derivatives of dioxane, vinyl sulfones, oxypolysaccharides such as oxystarch, oxy plant gums, inorganic hardeners such as chromium salts, and the like. Developing agents of the types suitable for developing out silver halide emulsions can also be included for desired development effects such as monobath processing.

The photographic silver halide emulsions disclosed herein can also contain non-ionic, anionic, and/or amphoteric coating aids. Some useful coating aids include, for example, saponin, alkyl substituted aryl oxy alkylene ethyl sulfonates of the type described in U.S. Pat. No. 2,600,831 issued June 17, 1952, maleopimarates of the type described in U.S. Pat. No. 2,823,123 issued Feb. 11, 1958, taurine derivatives of the type described in U.S. Pat. No. 2,739,891 issued Mar. 27, 1956, and alkyl aminopropionates of the type described in U.S. Pat. No. 3,133,816 issued May 19, 1964. Typical of still other coating aids and surfactants which can be employed in the emulsions of this invention include the alkylphenoxy poly(hydroxyalkylene oxides) such as alkylphenoxy poly(glycidols) having from five to about 12 glycidol units, for example, such as those disclosed in British Pat. No. 1,022,878 issued Mar. 16, 1966 to Olin Mathieson.

Conventionally, a silver halide emulsion of the disclosed types and containing at least one of the dyes of this invention as well as additional addenda is coated onto a photographic support material and dried to prepare a composite photographic element. Coating can be accomplished by a wide variety of techniques including hopper coating, flow coating, extrusion hopper coating, doctor blade coating, etc. Advantageous support materials include conventional photographic film base materials such as cellulose nitrate film, cellulose ester film, poly(vinyl acetal) film, polystyrene film, poly(ethylene terephthalate) film, polycarbonate film and related films or resinous materials, as well as glass, paper, metal and the like. Typically, a flexible support is employed, especially a paper support, which can be partially acetylated or coated with baryta and/or an alpha-olefin polymer, particularly a polymer of an alpha-oelfin containing two to 10 carbon atoms such as polyethylene, polypropylene, ethylenebutene copolymers and the like.

Photographic elements such as those previously described can be imagewise exposed and developed to prepare visible images. Useful developer compositions include a reducing agent which promotes the formation of a metallic silver image in the vicinity of latent (i.e., not visible) image specks of silver metal produced on exposure.

Typical reducing agents used in the developer composition include, for example, polyhydroxy-substituted aryl compounds such as hydroquinones, catechols and pyrogallols; ascorbic acid derivatives; aminophenols; p-phenylenediamines, and the like developing agents used in the photographic art. Particular examples of reducing agents for developer solutions are 2-methyl-3-chlorohydroquinone, bromohydroquinone, catechol, 5-phenyl catechol, pyrogallol monomethyl ether (1-methoxy-2,3-dihydroxybenzene) and 5-methylpyrogallol monomethyl ether, isoascorbic acid, N-methyl-p-aminophenol, dimethyl-p-phenylene diamine, 4-amino-N,N-di(n-propyl)aniline and 6-amino-1-ethyl-1,2,3,4-tetrahydroquinoline.

An exemplary developer composition, including a reducing agent such as those previously mentioned, has the formula:

| | |
|---|---|
| p-methylaminophenol | 3 gm. |
| Sodium sulfite (desiccated) | 45 gm. |
| Hydroquinone | 12 gm. |
| Sodium Carbonate (monohydrate) | 80 gm. |
| Potassium bromide | 2 gm. |
| Water to make | 1,000 cc. |

After development, residual unreduced silver halide is generally removed to stabilize the image, usually by the use of a fixing agent.

Conventional fixing agents or silver halide solubilizing agents include water-soluble thiosulfates, thiocyanates and mercaptans such as ammonium thiosulfate, sodium thiocyanate and the disodium salt of 2-mercapto-4-hydroxy-5-aminopyrimidine. A particularly preferred fixing agent is sodium thiosulfate. Stabilization is generally accomplished by treatment with a fixing bath that incorporates a fixing agent such as those mentioned previously. Exemplary of fixing baths is one having the formula:

| | |
|---|---|
| Sodium Thiosulfate | 240 gm. |
| Sodium sulfite (desiccated) | 15 gm. |
| Acetic acid (28% aqueous) | 48 cc. |
| Boric acid (crystals) | 7.5 gm. |
| Potassium alum | 15 gm. |
| Water to make | 1,000 cc. |

The following examples are included for a further understanding of the invention.

EXAMPLE 1

2-Chlorobenzothiazole (5.1 g., 0.03 mole) and freshly prepared triethyloxonium fluoborate (5.6 g., 0.03 mole) are dissolved in methylene chloride and allowed to stand for 8 hours. The white crystals which separate upon standing are filtered off, washed with methylene chloride and dried. The product, 2-chloro-3-ethylbenzothiazolium fluoborate is yielded in an amount of 7.20 g. (85 percent). This product is then refluxed for 5 minutes with 2-(2-chloropropenyl)-3-ethylbenzothiazolium chloride (7.12 g., 0.026 mole) trimethylamine (3.6 ml., 0.026 mole), and acetonitrile (30 ml.). The course of the reaction is easily followed by the gradual change in coloration as the $\mu$-chloro-3,3'-diethylthiacarbocyanine dye reaction product forms as a precipitate. The mixture is chilled and filtered. The dye is washed with acetonitrile and dried in vacuo. The yield is 4.8 g. (42 percent), representing a mixed chloride and fluoborate salt of the dye. Recrystallization from dimethylformamide twice gives the chloride salt of the dye, m.p. 260°–262° C. with decomposition.

Analysis for C, H, Cl, N:
Theoretical: C-57.9; H-4.6; Cl-16.3; N-6.4
Found: C-57.4; H-4.7; Cl-16.6; N-6.2

EXAMPLE 2

Additional dyes are prepared as in Example 1, except that in lieu of the 2-chlorobenzothiazole and 2-(2-chloropropenyl)-3-ethylbenzothiazolium chloride are substituted equivalent amounts of reagents as follows:

a. 2-chloro-3-ethylbenzoselenazolium fluoborate and 2-(2-chloropropenyl)-3-ethylbenzoselenazolium chloride,
b. 2-chloro-3-ethylbenzoxazolium fluoborate and 2-(2-chloro-propenyl)-3-ethylbenzothiazolium chloride, and
c. 2-chloro-1-ethyl-$\beta$-naphthothiazolium fluoborate and 2-(2-chloropropenyl)-1-ethyl-$\beta$-naphthothiazolium chloride to prepare the resultant $\mu$-substituted dyes
a. $\mu$-chloro-3,3'-diethylselenacarbocyanine chloride,
b. $\mu$-chloro-3,3'-diethyloxathiacarbocyanine chloride, and
c. $\mu$-chloro-3,3'-diethyl-4,5; 4',5'-dibenzothiacarbocyanine chloride respectively.

EXAMPLE 3

A sensitizing amount of the dye from Example 1 is added to separate portions of a gelatino-silver halide emulsion. Each of these emulsions are coated on pieces of cellulose ester support and dried. Spectrographic exposures are made on each coating, and these are processed in a photographic developer having the composition:

| | |
|---|---|
| p-Methylaminophenol sulfate | 2.0 grams |
| Sodium sulfite, desiccated | 90.0 grams |
| Hydroquinone | 8.0 grams |
| Sodium carbonate · H$_2$O | 52.5 grams |
| Potassium bromide | 5.0 grams |
| Water to make | 1 liter | fixed in a convention sodium thiosulfate fixing bath, washed and dried. The following table summarizes the wavelength of light to which the maximum sensitivity is produced and the longest wavelength light to which each emulsion is sensitized.

| | Wavelength of light in nm. to which each emulsion is sensitized | |
|---|---|---|
| Silver halide in emulsion | Dye produces maximum sensitivity | Dye sensitizes emulsion |
| Silver bromoiodide | 590 | 640 |
| Silver chlorobromide | 580 | 660 |

The invention has been described in detail with particular reference to preferred embodiments thereof, but it will be understood that variations and modifications can be effected within the spirit and scope of the invention.

I claim:

1. A light-sensitive, photographic silver halide emulsion comprising a hydrophilic colloid, silver halide grains and a sensitizing amount of a $\mu$-chlorocarbocyanine dye.

2. A silver halide emulsion as described in claim 1 wherein the μ-chlorocarbocyanine dye has the formula:

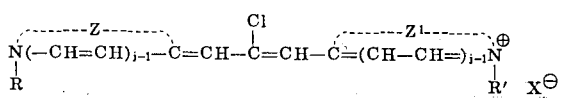

wherein
a. each of Z and $Z^1$ represents the nonmetallic atoms necessary to complete a heterocyclic nucleus of the type used in cyanine dyes,
b. $j$ represents a positive integer having a value of from 1 to 2,
c. each of R and $R^1$ represents an alkyl radical having from one to four carbon atoms, and
d. $X^\ominus$ represents a non-nucleophilic anion.

3. A silver halide emulsion as described in claim 2 wherein each of Z and Z′ represent the non-metallic atoms necessary to complete a heterocyclic nucleus having in said nucleus at least one atom selected from the group consisting of nitrogen, oxygen, sulfur and selenium.

4. A silver halide emulsion as described in claim 2 wherein each of Z and $Z^1$ represent the non-metallic atoms necessary to complete a heterocyclic nucleus selected from the group consisting of an indole nucleus, an imidazole nucleus, an oxazole nucleus, a thiazole nucleus, a selenazole nucleus and a quinoline nucleus.

5. A silver halide emulsion as described in claim 2 wherein the non-nucleophilic anion represented by $X^\ominus$ is selected from the group consisting of a halide anion, a fluoroborate anion, a sulfate anion, a hydrogen sulfate anion, an arylsulfonate anion, and a trifluoroacetate anion.

* * * * *